United States Patent

Bacarella et al.

(10) Patent No.: US 7,092,013 B2
(45) Date of Patent: Aug. 15, 2006

(54) INGAAS IMAGE INTENSIFIER CAMERA

(75) Inventors: Antonio V. Bacarella, Dallas, TX (US); Timothy E. Ostromek, Richardson, TX (US); Timothy B. Hogan, Irving, TX (US); Rodney L. Doster, Garland, TX (US); Jeffrey C. Short, Plano, TX (US); Joseph P. Estrera, Dallas, TX (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/250,119

(22) Filed: Jun. 4, 2003

(65) Prior Publication Data

US 2003/0231245 A1 Dec. 18, 2003

Related U.S. Application Data

(60) Provisional application No. 60/319,314, filed on Jun. 12, 2002.

(51) Int. Cl.
*H04N 5/225* (2006.01)

(52) U.S. Cl. .................... 348/217.1; 348/229.1

(58) Field of Classification Search ............ 348/217.1, 348/229.1, 216.1; 359/419, 399, 420, 421, 359/432; 206/316.1
See application file for complete search history.

(56) References Cited

U.S. PATENT DOCUMENTS

| 3,745,347 A | * | 7/1973 | deBrey et al. ............... 250/334 |
| 4,030,827 A | * | 6/1977 | Delhaye et al. ............. 356/301 |
| 4,151,415 A | * | 4/1979 | Lipke .......................... 250/333 |
| 4,463,252 A | | 7/1984 | Brennan et al. ...... 250/214 VT |
| 4,602,861 A | | 7/1986 | Taniguchi et al. ............ 396/81 |
| 4,679,068 A | | 7/1987 | Lillquist et al. .............. 348/33 |
| 4,751,571 A | | 6/1988 | Lillquist ..................... 348/164 |
| 4,920,412 A | * | 4/1990 | Gerdt et al. .................. 348/31 |
| 5,035,472 A | | 7/1991 | Hansen ....................... 359/350 |
| 5,268,570 A | | 12/1993 | Kim ..................... 250/214 VT |
| 5,378,640 A | | 1/1995 | Kim ............................. 438/20 |
| 5,485,530 A | * | 1/1996 | Lakowicz et al. ........... 382/191 |
| 5,557,451 A | | 9/1996 | Copenhaver et al. ....... 359/350 |
| H001599 H | | 10/1996 | Task et al. ..................... 348/33 |
| 5,729,010 A | | 3/1998 | Pinkus et al. ......... 250/214 VT |
| 5,729,376 A | | 3/1998 | Hall et al. ................... 359/366 |
| 5,756,989 A | * | 5/1998 | Bear et al. ............ 250/214 VT |
| 5,909,244 A | * | 6/1999 | Waxman et al. ......... 348/222.1 |
| 5,910,816 A | | 6/1999 | Fontenot et al. .............. 348/65 |
| 5,923,120 A | * | 7/1999 | Suzuki et al. ................ 313/532 |

(Continued)

FOREIGN PATENT DOCUMENTS

WO    WO 01/72033 A1    9/2001

*Primary Examiner*—Tuan Ho
*Assistant Examiner*—Nelson D. Hernandez
(74) *Attorney, Agent, or Firm*—Marsteller & Associates, P.C.

(57) ABSTRACT

An InGaAs Image Intensifier ("I2") Camera (C) detects and forms an image (310) to be viewed. An InGaAs photocathode Image Intensifier (312) is used to pass an amplified signal (316) from a screen (320). The InGaAs image intensification tube (312) is optically coupled (328) to an imaging device (322) for passing output light. The output light (316) from the InGaAs tube (312) is transformed by an electronic circuit (322) producing a desired signal output (324). The signal output (324) from the electronic circuit (322) may be further enhanced into an enhanced signal output (310). The enhanced signal output may be formatted into a form for viewing or may be saved.

16 Claims, 3 Drawing Sheets

U.S. PATENT DOCUMENTS

| | | | |
|---|---|---|---|
| 5,959,668 A * | 9/1999 | Cryder et al. | 348/229.1 |
| 6,121,612 A | 9/2000 | Sinor et al. | 250/330 |
| 6,327,073 B1 * | 12/2001 | Yahav et al. | 359/321 |
| 6,437,491 B1 | 8/2002 | Estrera et al. | 313/103 CM |
| 6,560,029 B1 | 5/2003 | Dobbie et al. | 359/630 |
| 6,707,054 B1 * | 3/2004 | Ray | 250/559.38 |
| 2001/0019361 A1 * | 9/2001 | Savoye | 348/222 |
| 2002/0191388 A1 * | 12/2002 | Matveev | 362/31 |
| 2002/0195561 A1 * | 12/2002 | Bacarella et al. | 250/330 |
| 2003/0066951 A1 * | 4/2003 | Benz et al. | 250/214 VT |

* cited by examiner

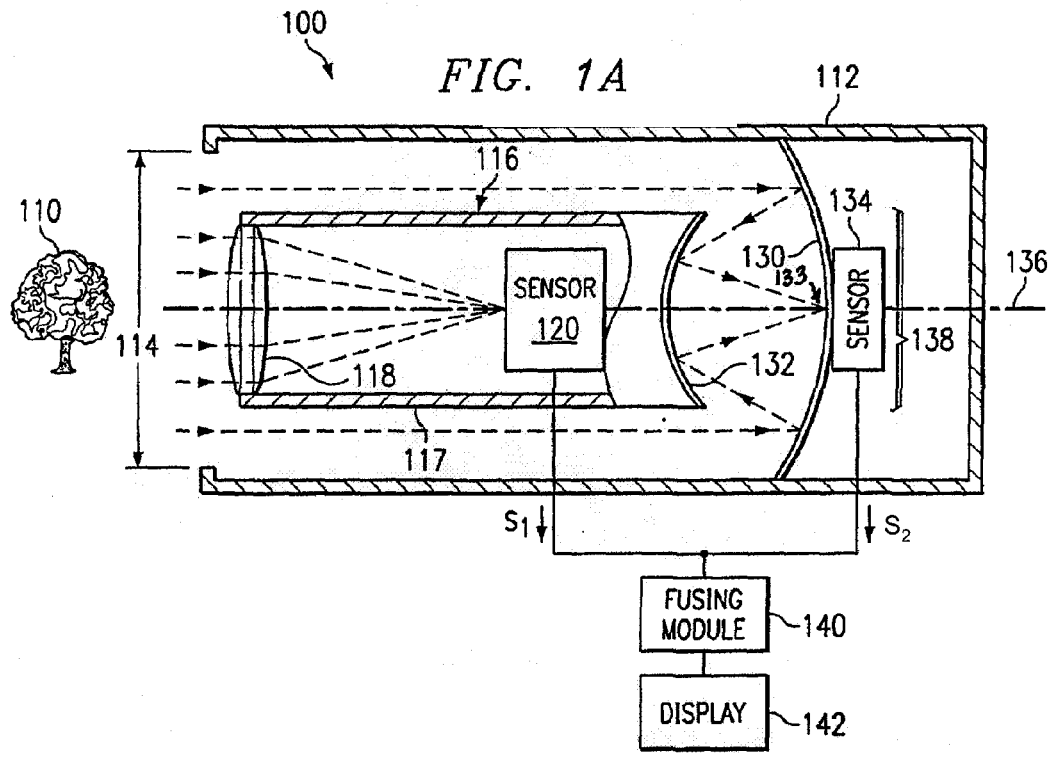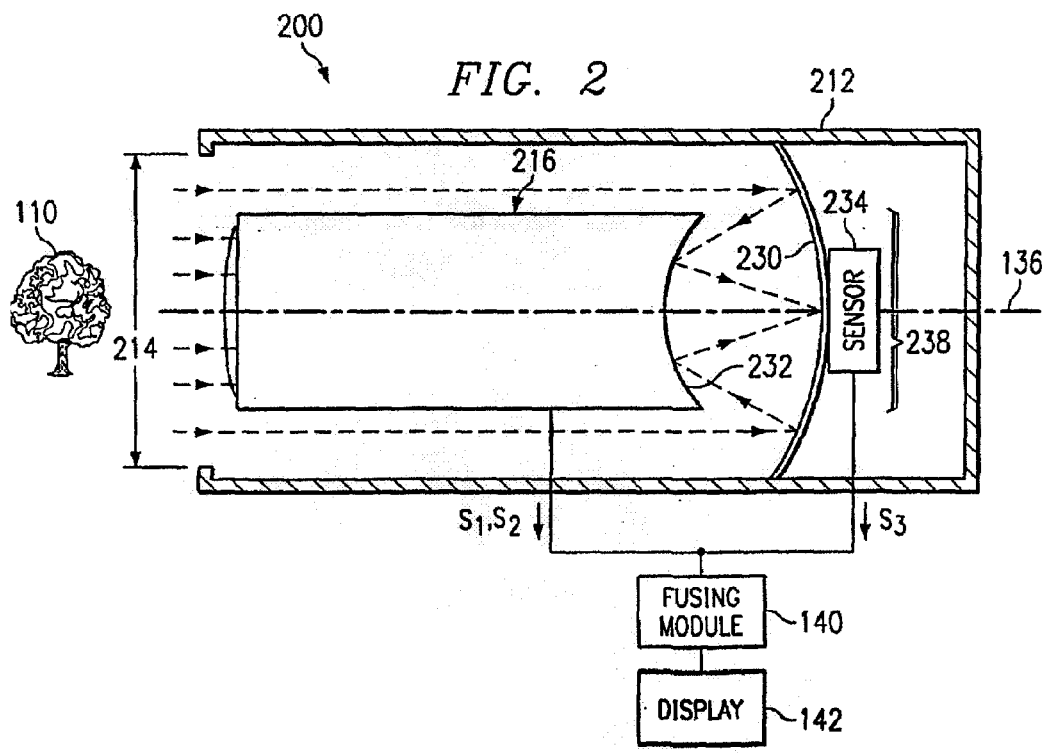

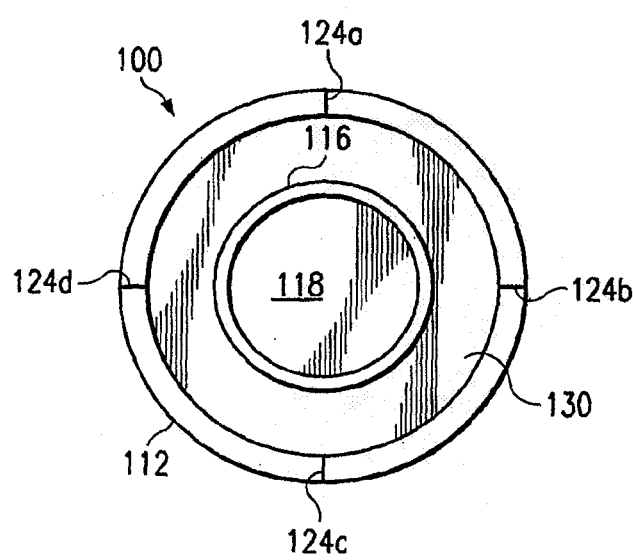
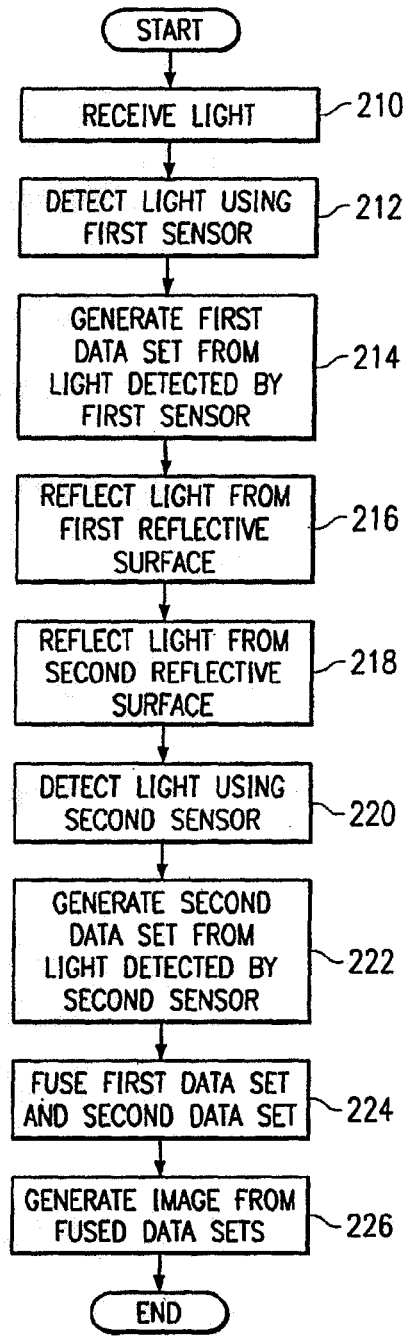

INGAAS IMAGE INTENSIFIER CAMERA

CROSS REFERENCE TO RELATED APPLICATIONS

This application claims the benefit of U.S. Provisional Application Ser. No. 60/319,314, filed Jun. 12, 2002, entitled INGAAS IMAGE INTENSIFICATION CAMERA.

BACKGROUND OF INVENTION

1. Technical Field

This invention relates generally to the field of imaging systems and more specifically to an InGaAs image intensification camera system.

2. Background Art

Multiple sensor imaging systems generate an image of an object by fusing data that is collected using multiple sensors. Gathering image data using multiple sensors, however, has posed challenges. In some systems, the sensors detect light received from separate apertures. Data generated from light from separate apertures, however, describe different points of view of an object that need to be reconciled in order to fuse the data into a single image. Additionally, using separate apertures for different sensors may increase the bulk of an imaging system.

In other systems, light from an aperture is split into components before entering the sensors. Reflective and refractive elements are typically used to direct the light to different sensors. For example, the system described in U.S. Pat. No. 5,729,376 to Hall et al. includes multiple reflective and refractive elements such as a lens that reflects light towards one sensor and refracts light towards another sensor. Each individual sensor, however, detects only a component of light, for example, only specific wavelengths of light, and thus cannot generate image data from the full spectrum. Additionally, multiple reflective and refractive elements may add to the bulk and weight of an imaging system. Consequently, gathering image data from multiple sensors has posed challenges for the design of imaging systems.

Image intensifier tubes that may have an InGaAs photocathode are known in the art. Examples of such image intensifier tubes are found in U.S. Pat. Nos. 5,268,570, 5378,640, 6,121,612, and 6,437,491.

While the above cited references introduce and disclose a number of noteworthy advances and technological improvements within the art, none completely fulfills the specific objectives achieved by this invention.

SUMMARY OF INVENTION

While known approaches have provided improvements over prior approaches, the challenges in the field of imaging systems have continued to increase with demands for more and better techniques having greater effectiveness. Therefore, a need has arisen for new methods and systems for gathering image data using multiple sensors.

In accordance with the present invention, an Indium Gallium Arsenide (InGaAs) Image Intensifier ("I2") Camera detects and forms an image to be viewed. The InGaAs photocathode Image Intensifier is used to pass an amplified signal from a screen in a manner well known in the art of image intensifier tubes. The InGaAs image intensification tube is optically coupled to an imaging device for producing an output optical signal or light from the. tube. The output signal from the InGaAs tube is transformed by an electronic circuit into a desired signal output. The signal output from the electronic circuit optionally may be further enhanced into an enhanced signal output. The enhanced signal output is then formatted into a form for viewing or may be saved.

Embodiments of the invention may provide numerous technical advantages. A technical advantage of one embodiment is that an InGaAs camera can be synchronized to an internal or external timing source. Consequently, embodiments of the present invention provide a system and method for gathering image data from multiple sensors in an effective and compact manner.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIGS. 1A and 1B illustrate one embodiment of a system for gathering image data;

FIG. 2 illustrates one embodiment of a system for gathering image data that includes three or more sensors;

FIG. 3 is a flowchart demonstrating one embodiment of a method that may be used with the system of FIG. 1.

DETAILED DESCRIPTION

Figure 4:
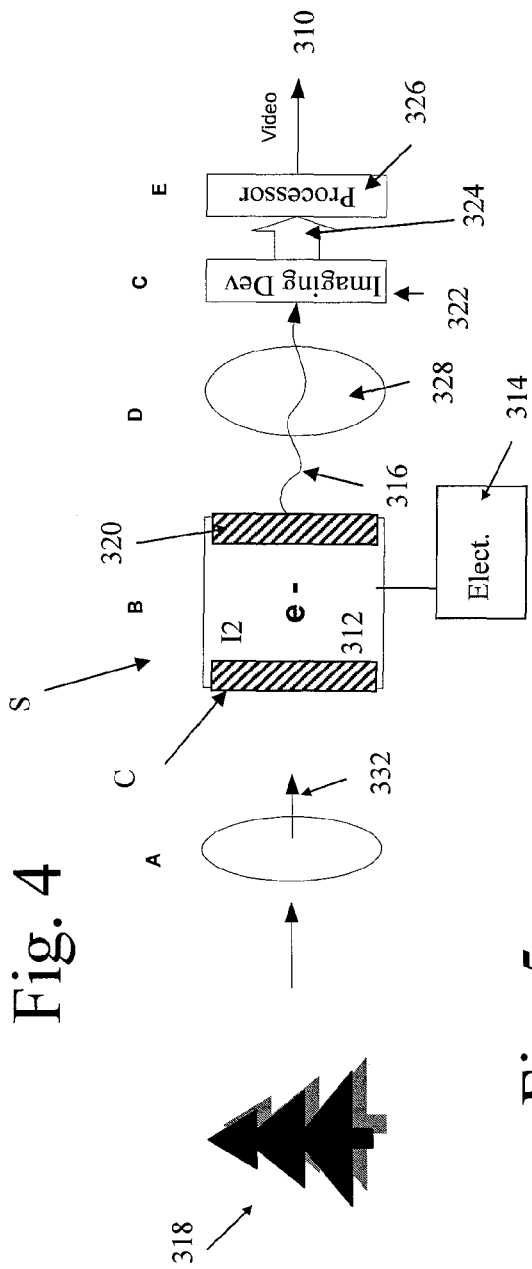
FIGS. 4 and 5 illustrate two alternative embodiments for the present InGaAs I2 camera.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

FIG. 1A illustrates a side view of one embodiment of a system 100 for gathering image data. System 100 receives light or an energy signal reflected from an object 110 and gathers information from the light or input signal to generate an image of object 110 on a display 142. System 100 may include an outer casing 112 having an aperture 114 through which light enters. Outer casing 112 may have any suitable shape such as a cylinder having a diameter in the range of 8–12 cm, for example, approximately 10 cm, and a length in the range of 12–15 cm, for example, approximately 14 cm. System 100 may also include an inner assembly 116 coupled to outer casing 112 with braces 124 as illustrated in FIG. 1B. FIG. 1B illustrates a front view of inner assembly 116 coupled to casing 112 with braces 124.

Referring to FIG. 1A, inner assembly 116 may include optics 118 and a sensor 120, each of which may be coupled to an inner casing 117. Inner casing 117 may have any suitable shape such as a cylinder having a diameter in the range of 3 to 6 cm, for example, approximately 4.5 cm, and a length in the range of 7 to 10 cm, for example, approximately 8 cm in length. Optics 118 focuses light reflected from object 110 onto sensor 120. Optics 118 may include, for example, a lens comprising glass or polymer having a radius in the range of 3 to 5 cm, for example, approximately 4 cm, and a focal length in the range of 20–22 mm, for example, approximately 22 mm. Optics 118, however, may include any suitable optical element or configuration of optical elements for focusing light from object 110 onto sensor 120.

Sensor 120 detects the light reflected from object 110 directly through aperture 114, that is, through an uninterrupted pathway. Sensor 120 may be placed such that sensor 120 receives light generally in a direction that light travels from object 110 to aperture 114. Sensor 120 may detect certain types of energy, for example, infrared energy, of the light. Sensor 120 may enhance certain features of light or the signal such as, for example, an image intensifier tube or sensor. Sensor 120, however, may comprise any suitable sensor, for example, a long wave infrared sensor, a low light level charge coupled device (LLLCCD), or a complementary metal-oxide semiconductor (CMOS) sensor. A tube design generally would receive IR light and produce a visible light output signal, whereas a sensor design would receive visible light.

Sensor 120 generates sensor data set $S_1$ in response to the received light or input energy signal. Sensor data set $S_1$ may include values assigned to pixels corresponding to points of light, where the values represent image information such as brightness or color associated with the points of light. Sensor 120 transmits sensor data set $S_1$ to a fusing module 140.

System 100 may also include an outer assembly 138 comprising reflective surfaces 130 and 132 and a sensor 134. Reflective surface 130 and sensor 134 may be coupled to outer casing 112, and reflective surface 132 may be coupled to inner casing 117. Any suitable configuration, however, may be used, for example, outer assembly 138 may be configured as a Schmidt-Cassegran catadioptric optical assembly, a diffractive optical system, or any combination of suitable configurations.

Reflective surface 130 receives light or the input energy signal from object 110 through aperture 114 and reflects the received light or signal. Reflective surface 130 may comprise a metallic or dichroic mirror having a diameter in the range of 8 to 10 cm, for example, approximately 9 cm and a focal length in the range of 24 to 26 mm, for example, approximately 25 mm. Reflective surface 130, however, may comprise any material and may have any shape suitable for receiving light through aperture 114 and reflecting light to reflective surface 132. Reflective surface 132 receives light or an energy or optical signal from reflective surface 130 and reflects the received light. Reflective surface 132 may comprise a metallic or dichroic mirror having a diameter in the range of 7 to 10 cm, for example, approximately 8 cm and a focal length in the range of 24 to 26 mm, for example, approximately 25 mm. Reflective surface 132, however, may comprise any material and may have any shape suitable for receiving light from reflective surface 130 and reflecting light to a receptor area 133 of sensor 134.

Receptor area 133 of sensor 134 detects light reflected from reflective surface 132. Sensor 134 may include, for example, an infrared sensor or an image intensifier sensor. Sensor 134, however, may comprise any suitable sensor, for example, a long wave infrared sensor, a medium wave infrared sensor, a short wave infrared sensor, a low light level charge coupled device (LLLCCD), or a complementary metal-oxide semiconductor (CMOS) sensor. Sensor 134 generates sensor data set $S_2$ in response to the received light. Sensor 134 may generate a different type of data set than that generated by sensor 120. For example, sensor 120 may include an infrared sensor that detects infrared energy of received light to generate a data set, and sensor 134 may include an image intensifier sensor that enhances certain features of received light to generate a different type of data set. Sensor data set $S_2$ may include values assigned to pixels corresponding to points of light, where the values represent image information associated with the points of light. Sensor 134 transmits sensor data $S_2$ to fusing module 140.

System 100 may have a central axis 136 located approximately along a light path from object 110 to receptor area 133 of sensor 134. Sensor 120 and sensor 134 may be substantially coaxial such that sensor 120 and sensor 134 receive light at a point approximately along central axis 136. Sensor 120 and sensor 134 may be configured such that the diameter of inner assembly 116 is less than the diameter of reflective surface 130, and inner assembly 116 is approximately centered over reflective surface 130 as illustrated in FIG. 1B. FIG. 1C illustrates a front view of system 100 where inner assembly 116 is approximately centered in front of reflective surface 130. In the illustrated embodiment, the configuration of sensors 120 and 134 allows sensors 120 and 134 to receive light from the same aperture 114 with minimal reflective and refractive elements, providing for a compact imaging system.

Fusing module 140 receives sensor data $S_1$ and $S_2$ from sensors 120 and 134, respectively. Fusing module 140 fuses sensor data sets $S_1$ and $S_2$ to generate fused data. For example, fusing module 140 combines values of sensor data sets $S_1$ and $S_2$ for pixels corresponding to the same point of light to generate the fused data. Fusing module 140 may use any suitable process for fusing data sets $S_1$ and $S_2$ for example, digital imaging processing, optical overlay, or analog video processing.

In the illustrated embodiment, sensor 120 and sensor 134 detect light received through the same aperture 114, so both sensors 120 and 134 receive light describing the same point of view of object 110. As a result, fusing module 140 does not need to perform data processing to reconcile different points of view. Additionally, since minimal reflective and refractive elements are used, the light detected by sensors 120 and 134 undergoes few changes. As a result, fusing module 140 does not need to perform processing to compensate for changes due to multiple reflective and refractive elements.

Display 142 receives the fused data from fusing module 140, and generates an image of object 110 using the fused data. Display 142 may include any suitable system for displaying image data, such as an organic light-emitting diode (OLED), nematic liquid-crystal display (LCD), or field emitting display (FED), in panel display, eyepiece display, or near-to-eye display formats. Optionally, display 142 may be an external display, television, Universal Serial Bus (USB) type connection, IEEE 1334 or firewire type connection, or similar.

Although the illustrated embodiment shows two sensors 120 and 134, the system of the present invention may include any suitable number of sensors, as described in connection with FIG. 2.

FIG. 2 is a block diagram of one embodiment of a system 200 that includes three sensors for gathering image data. System 200 includes an inner assembly 216 coupled to an outer casing 212. Inner assembly may be substantially similar to system 100 of FIG. 1, which includes two sensors 120 and 134. Outer assembly 238 may be substantially similar to outer. assembly 138. That is, reflective surfaces 230 and 232, which may be substantially similar to reflective surfaces 130 and 132, respectively, are coupled to inner assembly 216 and outer casing 212, respectively. Additionally, sensor 234, which may be substantially similar to sensor 134, is coupled to outer casing 212. Sensors 120, 134, and 234 may be substantially coaxial. Fusing module 140 is coupled to sensors 120, 134, and 234, and display 142 is coupled to fusing module 140.

In operation, system 200 receives light reflected from object 110. Inner assembly 216 may generate data sets $S_1$ and $S_2$ in a manner substantially similar to that of system 100 of FIG. 1. Sensor 234 receives light reflected from reflective surfaces 230 and 232 in a substantially similar matter to that of sensor 134 to generate dataset $S_3$. Fusing module 140 receives datasets $S_1$, $S_2$ and $S_3$ and fuses the datasets to generate fused data. Display 142 receives the fused data and generates an image from the fused data. Additional sensors may be added to system 200.

FIG. 3 is a flowchart illustrating one embodiment of a method for gathering image data using system 100 of FIG. 1. The method begins at step 210, where light reflected from object 110 is received by aperture 114. The reflected light includes image information that may be used to form an image of object 110. At step 212, sensor 120 detects the received light. Optics 118 may be used to focus the light onto sensor 120. Sensor 120 generates a data set $S_1$ from the detected light and transmits data set $S_1$ to fusing module 140 at step 214. Sensor 120 may, for example, detect infrared light reflected from object 110 and generate a data set $S_1$ that describes the infrared light.

At step 216, reflective surface 130 receives light from object 110 and reflects the received light to reflective surface 132. Reflective surface 132 receives the reflected light and, in turn, reflects the received light to sensor 134 at step 218. At step 220, sensor 134 detects light reflected from reflective surface 132. Sensor 134 generates data set $S_2$ from the received light at step 222. Sensor 134 may include an image intensifier sensor that enhances certain features of the light received from object 110, and may generate a data set that describes the enhanced features.

At step 224, fusing module 140 receives data sets $S_1$ and $S_2$ and fuses the received data sets to generate fused data. Fusing module 140 may, for example, combine values from data sets $S_1$ and $S_2$ for pixels corresponding to the same point of light. Display 142 receives the fused data and then displays an image of object 110 at step 226. After displaying the image, the method terminates.

Figure 5:
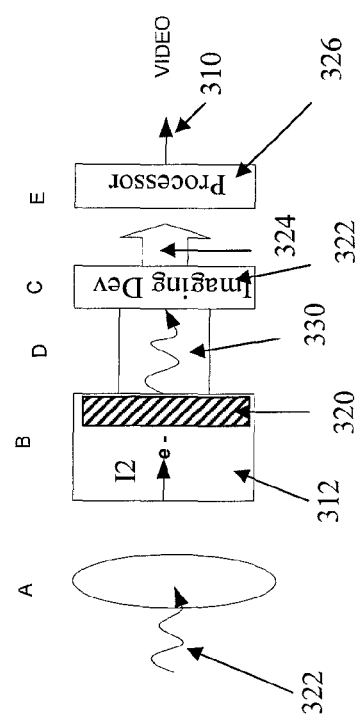

Referring now to FIGS. 4 and 5, the present invention is a detector system S that includes an InGaAs Image Intensifier ("I2") Camera C to detect and form an image 310 to be viewed. An InGaAs photocathode Image Intensifier tube 312 with associated electronics 314 is used to pass an amplified signal 316 from a screen 320 that is typically photo-luminescent. The amplified signal 316 is a representative picture of the scene to be observed 318.

The InGaAs image intensification tube 312 is optically coupled to an imaging device 322 for passing or generating an output light. The output light from the InGaAs tube 312 is transformed by an electronic circuit 322 producing a desired signal output 324. The signal output 324from the electronic circuit 322 optionally may be further enhanced by s processor 326 into an enhanced signal output 312. The enhanced signal output 312 may then be further formatted into a form for viewing or may be saved.

An InGaAs photocathode Image Intensifier 312, preferably a gated type with external synchronization achieved by the accompanying electronics package 314, collects photons and applies a gain to the collection of photons permitting their processing into a viewable or perceivable image 316 in the manner commonly understood for image intensifier tubes. The InGaAs image intensifier tube 312 will then pass the amplified-signal 316 on as an output from its screen 320, generally phosphorescent. The I2 tube 312 may also include synchronizable gate-disable electronic circuit as a function of the electronics package 314 for maximum infrared efficiency.

The InGaAs image intensification tube 312 may be coupled to an imaging device 322 using either a relay optic or fiber optic bundle 328, or the I2 tube 312 may be coupled to the imaging device 322 using the fiber 330 from the tube itself.

The output light 316 from the InGaAs tube 312 is then transformed by either digital or analog electronic circuitry 322 using known types of imaging devices. Some examples suitable for use in the present invention are charged couple devices (CCD) and CMOS imagers, but are not limited to these two alternatives.

The data or signal output 324 from the digital or analog electronic circuitry 322 may then be further enhanced with electronic (digital/analog) circuitry 326. Some examples of known ways to enhance the output signal are: Dynamic Range expansion, contrast and brightness enhancement, noise filtering, object recognition, edge enhancement, but these enhancements are not limited to these mentioned.

After any desired enhancement the data can then be formatted to a form that may be saved or displayed.

One embodiment of the present system consists of dual imaging sensors that can compliment each other and display the complimentary data to a user. The sensors can be from separate spectral bands, separate polarities, separate energy intensity viewing range within the same band or even totally sensed uncorrelated data from an artificial source.

The above illustrated apparatus for fusing two images may incorporate on sensor being the present InGaAs I2 camera. By way of example, one embodiment of the present invention may incorporate 2 spectral regions: one band of 1.1 μm down to 800 nm in wavelength, and a second band of 850 nm down to 400 nm. The two sensors in the first embodiment are image intensifiers. One sensor uses a known GaAs type of image intensifier tube, and the second image intensifier using InGaAs. The two sensors are on the same optical Axis for parallax elimination. The two sensed images are correlated in perspective, enhanced, and weighted merged.

System benefits for the present invention using an InGaAs type of image intensifier tube include:

1. The InGaAs imager detects 1.06 μm wavelength, and may be externally or internally synchronized to a laser source.

2. The InGaAs camera can stay synchronized, and can adjust exposure versus time for a maximum signal to noise ratio.

A vision system may incorporate two Image Intensifiers 312 that can sense and display imagery from 400 nm wavelengths up to 1.3 μm wavelengths. The sensors are capable of synchronizing to a laser using known techniques so that laser returns for selected ranges are sensed. The target of this alternative system, but not a system limitation, is to synchronize to an external 1.06 μm pulsed laser and sense its return radiation from the scene. The reason that synchronization is needed is that a gated tube may be used, which extends dynamic range and lifetime of the image tube. See U.S. patent application Ser. No. 09/888,133, filed Jun. 22, 2001, which is incorporated by reference herein, for an example of such a system.

The present invention may also be used to predict future laser timing for a stable source.

The sensed data is collected by two fiber optically coupled CMOS detectors. These detectors transform the sensed data into the digital space or circuit where the data signals are enhanced, aligned, weighted, and are either buffered for further manipulation or displayed. The system optionally has an on-screen laser interface that can be used to adjust parameters of each image intensifier, each CMOS detector, image alignment, image scale, display parameters ballistic reticle size, battery monitor, merge ratio, indicator, or on screen intensity histogram, by way of example.

In summary an output image signal 310 of a desired scene 318 is produced using an image intensifier tube 312 that has an InGaAs type of photocathode. A scene image 332 is received using the InGaAs photocathode Image Intensifier 310. An initial representative picture 316 of the scene is generated with the output screen 320 of the InGaAs image intensification tube 310. The initial representation picture 316 is electro-optically communicated to an imaging device 322. The initial representation picture signal 316 is then transformed into an electronic data stream 324 with the imaging device 322. Finally the data stream 324 is electronically processed into a desired output format 310.

The foregoing disclosure and description of the invention are illustrative and explanatory thereof, and various changes in the size, shape and materials, as well as in the details of the illustrated construction may be made without departing from the spirit of the invention.

The invention claimed is:

1. An InGaAs Image Intensifier ("I2") Camera for detecting and forming an image to be viewed, the camera comprising:
   an InGaAs photocathode Image Intensifier to pass an amplified signal from a screen;
   the InGaAs image intensification tube being optically coupled to an imaging device for passing output optical signal;
   the output optical signal from the InGaAs tube being transformed by an electronic circuit for producing a desired signal output;
   the signal output from the electronic circuit being further enhanced into an enhanced signal output;
   means for processing the enhanced signal output from the electronic circuit for desired viewing; and
   the InGaAs image intensification tube is synchronized to a source.

2. The invention of claim 1 wherein a relay optic device optically couples the InGaAs image intensifier tube to the imaging device.

3. The invention of claim 1 wherein a fiber optic bundle optically couples the InGaAs image intensifier tube to the imaging device.

4. The invention of claim 1 wherein the electronic circuit for producing the desired signal output is a charged coupled device (CCD).

5. The invention of claim 1 wherein the electronic circuit for producing the desired signal output is a CMOS imager device.

6. The invention of claim 1 wherein the enhanced signal output is subjected to dynamic range expansion.

7. The invention of claim 1 wherein the enhanced signal output is subjected to contrast and brightness enhancement.

8. The invention of claim 1 wherein the InGaAs image intensification tube is synchronized to a laser source.

9. The invention of claim 1 wherein the InGaAs image intensification tube is synchronized to an external source.

10. The invention of claim 1 wherein the InGaAs image intensification tube is synchronized to an internal source.

11. A method for producing an image of a desired scene using an image intensifier tube having an InGaAs type of photocathode, comprising:
    receiving a scene image using the InGaAs photocathode Image Intensifier;
    generating an initial representative picture of the scene with the output screen of the InGaAs image intensification tube;
    communicating the initial representation picture to an imaging device;
    transforming the initial representation picture into an electronic data stream with the imaging device;
    processing the data stream into a desired output format; and
    synchronizing the InGaAs image intensification tube with a source.

12. The method of claim 11 wherein the initial representation picture is communicated to the imaging device by a relay optic.

13. The method of claim 11 wherein the initial representation picture is communicated to the imaging device by a fiber optic bundle.

14. The method of claim 11 wherein the InGaAs image intensification is synchronized to a laser source.

15. The method of claim 11 wherein the InGaAs image intensification tube is synchronized to an external source.

16. The method of claim 11 wherein the InGaAs image intensification tube is synchronized to an internal source.

* * * * *